(12) United States Patent
Trewella

(10) Patent No.: US 10,196,570 B2
(45) Date of Patent: Feb. 5, 2019

(54) REFORMATE PROCESS FOR PRODUCING A FUEL FROM BIOMASS

(71) Applicant: Jeffrey C. Trewella, Kennett Square, PA (US)

(72) Inventor: Jeffrey C. Trewella, Kennett Square, PA (US)

(73) Assignee: Inaeris Technologies, LLC, Pasadena, TX (US)

( * ) Notice: Subject to any disclaimer, the term of this patent is extended or adjusted under 35 U.S.C. 154(b) by 0 days.

(21) Appl. No.: 15/239,690

(22) Filed: Aug. 17, 2016

(65) Prior Publication Data

US 2016/0355737 A1 Dec. 8, 2016

Related U.S. Application Data

(62) Division of application No. 13/659,867, filed on Oct. 24, 2012, now abandoned.

(51) Int. Cl.

| | |
|---|---|
| C10G 1/00 | (2006.01) |
| C10G 35/085 | (2006.01) |
| C10G 35/09 | (2006.01) |
| C10L 1/06 | (2006.01) |
| C10G 35/04 | (2006.01) |
| C10G 59/00 | (2006.01) |
| C10G 3/00 | (2006.01) |

(52) U.S. Cl.
CPC ............ *C10G 1/002* (2013.01); *C10G 1/006* (2013.01); *C10G 3/40* (2013.01); *C10G 3/42* (2013.01); *C10G 3/50* (2013.01); *C10G 35/04* (2013.01); *C10G 35/085* (2013.01); *C10G 35/09* (2013.01); *C10G 59/00* (2013.01); *C10L 1/06* (2013.01); *C10G 2300/1014* (2013.01); *C10G 2300/301* (2013.01); *C10G 2300/305* (2013.01); *C10G 2400/02* (2013.01); *C10G 2400/30* (2013.01); *Y02P 30/20* (2015.11)

(58) Field of Classification Search
USPC ..... 403/148; 585/240, 25, 312, 319; 92/187, 92/28
See application file for complete search history.

(56) References Cited

U.S. PATENT DOCUMENTS

| | | | | |
|---|---|---|---|---|
| 5,186,722 A | * | 2/1993 | Cantrell | .............. C10G 1/08 44/605 |
| 2009/0223868 A1 | * | 9/2009 | Bhan | ................. B01J 21/12 208/216 R |
| 2012/0238787 A1 | * | 9/2012 | Gruber | ................ C07C 1/24 585/14 |

OTHER PUBLICATIONS

PROOPS "Conversion Unit Yield Analysis"; Feb. 2010.*

* cited by examiner

*Primary Examiner* — Prem C Singh
*Assistant Examiner* — Chantel Graham
(74) *Attorney, Agent, or Firm* — John Wilson Jones; Jones Delflache LLP

(57) ABSTRACT

Naphtha compositions with enhanced reformability are provided. The naphtha compositions can be derived from biomass, can exhibit improved N+2A values, and can be used as a reformer feedstock with little or no processing.

21 Claims, 1 Drawing Sheet

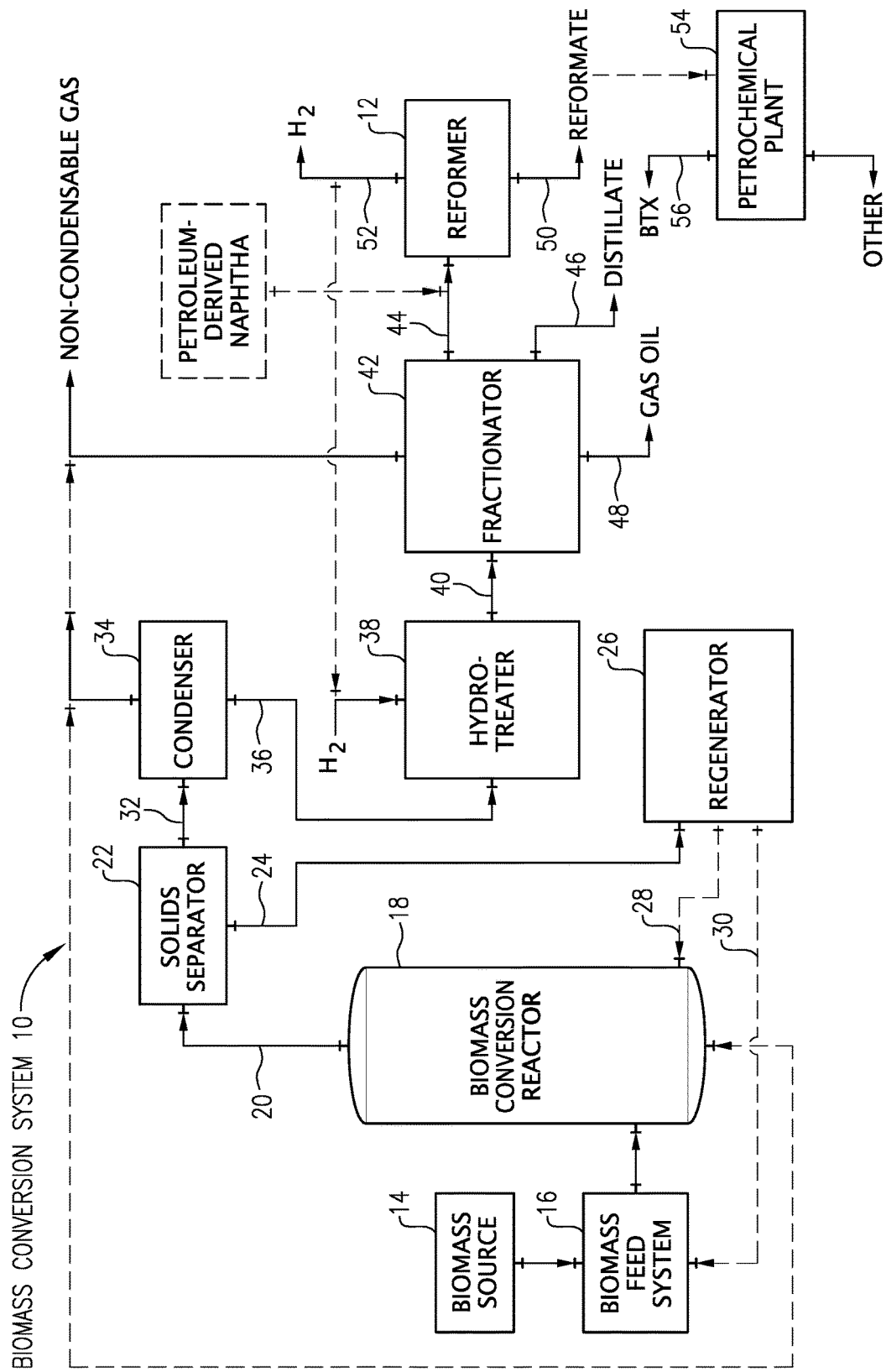

ical application of U.S. patent application Ser. No. 13/659,867, filed on Oct. 24, 2012 which claims the benefit of U.S. patent application Ser. No. 61/552,296, filed on Oct. 27, 2011.

REFORMATE PROCESS FOR PRODUCING A FUEL FROM BIOMASS

This application is a divisional application of U.S. patent application Ser. No. 13/659,867, filed on Oct. 24, 2012 which claims the benefit of U.S. patent application Ser. No. 61/552,296, filed on Oct. 27, 2011.

FIELD OF THE INVENTION

The present invention relates generally to naphtha compositions with enhanced reformability and to processes for making such naphtha compositions. Certain embodiments of the invention relate to naphtha compositions made from biomass-based feedstocks.

BACKGROUND OF THE INVENTION

Reforming of naphtha has long been utilized in the petroleum refining industry to produce high octane reformates, a high value gasoline blend stock, and hydrogen, which can both be used elsewhere for hydrotreating. Currently, the majority of naphtha feedstocks used for reforming are derived from petroleum-based feedstocks. Unfortunately, petroleum-derived naphtha feedstocks can vary greatly in quality depending on their origin and method of production. Such variability in feedstock quality can lead to lower quality reformate. Additionally, reforming costs can increase due to these low quality feedstocks because they require additional pretreatments before they can be utilized as a reformer feed. To further complicate matters, the expense of producing a naphtha composition from a petroleum-based feedstock has increased due to the rising costs of petroleum-feedstocks. Due to the potential decline of global petroleum stocks, there is a strong incentive to utilize naphtha compositions that are derived from renewable resources.

In response to the shortcomings associated with petroleum-derived naphtha compositions, there has been an increasing emphasis on producing naphtha from renewable resources such as biomass. In many of these processes, biomass is converted into various end-products that can be subsequently refined and converted into a naphtha composition. Unfortunately, these processes still produce a lower quality naphtha composition that requires extensive refining and treatment before it can be used as a reformer feedstock. Such extensive refining requirements greatly increase the overall costs of producing a high quality naphtha composition from biomass.

It would therefore be advantageous to be able to produce a high quality naphtha from biomass that does not require substantial refining and treatment prior to reforming.

SUMMARY OF INVENTION

In one embodiment of the present invention, a process for producing a fuel is provided. The process comprises the step of reforming a naphtha in the presence of a reforming catalyst to thereby produce hydrogen and a reformate. The naphtha has an N+2A value of at least 90 percent by volume and a paraffins content of not more than 10 percent by volume.

In another embodiment of the present invention, a process for producing a fuel is provided. The process comprises the steps of: (a) thermo-catalytically converting a biomass material to thereby produce a bio-oil; (b) hydrotreating at least a portion of the bio-oil to thereby produce a hydrotreated bio-oil; (c) fractionating at least a portion of the hydrotreated bio-oil to thereby produce at least a hydrotreated biomass-derived naphtha fraction and a hydrotreated bio-distillate fraction; and (d) reforming at least a portion of the hydrotreated biomass-derived naphtha fraction to thereby produce hydrogen and a reformate. The hydrotreated biomass-derived naphtha fraction has an N+2A value of at least 90 percent by volume and a paraffins content of less than 10 percent by volume.

In yet another embodiment, a naphtha composition is provided that comprises at least 20 volume percent naphthenes, at least 20 volume percent aromatics, and not more than 10 volume percent paraffins. The naphtha composition has an N+2A value of at least 90 percent by volume.

BRIEF DESCRIPTION OF THE DRAWING FIGURES

Embodiments of the present invention are described in detail below with reference to the attached FIGURE, wherein:

FIG. 1 is a schematic diagram of a biomass conversion system according to one embodiment of the present invention.

DETAILED DESCRIPTION

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The present invention relates to the production of a naphtha composition with enhanced reformability. In certain embodiments, the enhanced naphtha composition is at least partly derived from biomass. The naphtha compositions of the present invention can have N+2A values that are higher than conventional petroleum-derived and conventional biomass-derived naphthas. For instance, the naphtha composition of the present invention can have an N+2A value of at least 90, 95, 100, 105, or 110 and/or not more than 200, 150, or 125 percent by volume. The "N+2A value" as used herein refers to the combined value of the naphthenes volume percent plus double the aromatics volume percent. The naphtha composition can have a naphthenes content of at least 20, 30, 40, 50, or 55 and/or not more than 80, 70, or 60 percent by volume. Additionally or alternatively, the naphtha composition can have an aromatics content of at least 20, 25, 30, 35, or 40 and/or not more than 70, 60, or 50 percent by volume. In addition to having a high N+2A value, the naphtha composition can also have a low paraffins content. For example, the naphtha composition can have a paraffins content of at least 0.01, 0.1, or 0.5 and/or not more than 8, 6, 4, or 2 percent by volume.

The naphtha composition of the present invention can be made up of a mixture of different hydrocarbon compounds. For example, the naphtha composition of the present invention can comprise at least 5, 10, 15, or 20 different hydrocarbon compounds. In certain embodiments, the inventive naphtha composition is derived predominately of non-petroleum sources and therefore can have a radiocarbon signature of at least 50, 75, 90, 95, or 100 percent modern carbon (pMC) as measured by ASTM D6866-11.

FIG. 1 depicts an exemplary embodiment of a biomass conversion system 10 suitable for producing the naphtha composition of the present invention. The biomass conversion system 10 of FIG. 1 can include a reformer 12 that reforms the naphtha composition to produce a reformate and hydrogen. It should be understood that the biomass conversion system 10 shown in FIG. 1 is just one example of a system within which the present invention can be embodied. The present invention may find application in a wide variety of other systems where it is desirable to efficiently and effectively produce bio-oil, upgrade bio-oil, generate hydrogen, and/or produce a number of useful products from the byproducts of biomass conversion. The exemplary biomass conversion system 10 illustrated in FIG. 1 will now be described in more detail.

The biomass conversion system 10 of FIG. 1 includes a biomass source 14 for supplying a biomass feedstock to the system. The biomass source 14 can be, for example, a hopper, storage bin, railcar, over-the-road trailer, or any other device that may hold or store biomass. The biomass supplied by the biomass source 14 can be in the form of solid particles. In one embodiment, the biomass particles can be fibrous biomass materials comprising cellulose. Examples of suitable cellulose-containing materials include algae, paper waste, and/or cotton linters. In another embodiment, the biomass particles can comprise a lignocellulosic material. Examples of suitable lignocellulosic materials include forestry waste such as wood particles, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 14 can be supplied to a biomass feed system 16. The biomass feed system 16 can be any system capable of feeding solid particulate biomass to a biomass conversion reactor 18. While in the biomass feed system 16, the biomass material may undergo a number of pretreatments to facilitate the subsequent conversion reactions. Such pretreatments may include drying, roasting, torrefaction, demineralization, steam explosion, mechanical agitation, grinding, milling, debarking, and/or any combination thereof.

In one embodiment, it may be desirable to combine the biomass with a catalyst in the biomass feed system 16 prior to introducing the biomass into the biomass conversion reactor 18. Alternatively, the catalyst may be introduced directly into the biomass conversion reactor 18. The catalyst may be fresh and/or regenerated catalyst. The catalyst can be a heterogeneous cracking catalyst such as, for example, a solid acid, an amorphous silica-alumina, alumina phosphates, or a zeolite. Examples of suitable zeolites include ZSM-5, ZSM-11, ZSM-12, ZSM-18, ZSM-22, ZSM-23, zeolite-L, Mordenite, Beta, Ferrierite, zeolite-Y, or combinations thereof. Additionally or alternatively, the catalyst may comprise a super acid. Examples of suitable super acids include Nafion-H, sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases include layered double hydroxides, mixed metal oxides, hydrotalcite, clays, and/or combinations thereof. In yet another embodiment, the catalyst can also comprise an alumina, such as alpha-alumina.

In certain embodiments, the catalyst can be an equilibrium catalyst (E-cat) from a fluid catalytic cracking (FCC) unit of an oil refinery. This term refers to catalyst material that has, on average, circulated in the FCC unit for a considerable length of time. The term is used to distinguish fresh catalyst, which has not been exposed to the environment of the FCC unit, and which has much greater catalytic activity than the E-cat. This spent catalyst is a waste product from oil refineries, and as such, is abundantly available at low cost.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 18, they are not considered catalysts.

The biomass feed system 16 introduces the biomass feedstock into the biomass conversion reactor 18. In the biomass conversion reactor 18, biomass is subjected to a conversion reaction that produces bio-oil. The reactor 18 can be any system or device capable of converting biomass to bio-oil. The biomass conversion reactor 18 can be, for example, a fluidized bed reactor, a cyclone reactor, an ablative reactor, or a riser reactor. While in the biomass conversion reactor 18, the biomass feedstock can be subjected to thermochemical conversion or thermo-catalytic conversion in order to produce bio-oil.

"Thermochemical conversion" as used herein refers to a non-catalytic conversion process such as, for example, fast pyrolysis, alkylation, isomerization, decarboxylation, or decarbonylation. In certain embodiments, the thermochemical conversion refers to fast pyrolysis processes, which convert all or part of the biomass to bio-oil by heating the biomass in an oxygen-poor or oxygen-free atmosphere. Fast pyrolysis utilizes much shorter residence times that conventional pyrolysis, i.e., less than 10 seconds. For example, the residence times of fast pyrolysis can be, for example, less than 10, 5, 2, or 1 seconds. Additionally, fast pyrolysis can occur at temperatures of at least 200° C., 300° C., 400° C., or 500° C. and not more than 1,000° C., 800° C., 700° C., or 600° C. As used above, the term "oxygen-poor" refers to an atmosphere containing less oxygen than ambient air. In general, the amount of oxygen should be such as to avoid combustion of the biomass material, or vaporized and gaseous products emanating from the biomass material, at the pyrolysis temperature. Preferably, the atmosphere is essentially oxygen-free such that it contains less than about 1 weight percent oxygen. As used herein, "oxygen-free" refers to an atmosphere that is substantially free of molecular oxygen.

"Thermo-catalytic conversion" as used herein refers to a catalytic conversion process, wherein a catalyst is used to help facilitate cracking, alkylation, isomerization, decarboxylation, and/or decarbonylation of the biomass and/or its conversion products. In certain embodiments, the thermo-catalytic process occurs under fast pyrolysis conditions. Accordingly, in a biomass thermo-catalytic conversion process, a catalyst is used in the reactor 18 to facilitate the conversion of the biomass to bio-oil. As previously discussed, the catalyst can be pre-mixed with the biomass before introduction into the reactor 18 or it can be introduced into the reactor 18 separately.

In one embodiment, the biomass conversion reactor 18 can be a riser reactor with the conversion reaction being biomass thermo-catalytic conversion. As discussed above, the biomass thermo-catalytic conversion should occur in an oxygen-poor or, preferably, oxygen-free atmosphere. In another embodiment, biomass thermo-catalytic conversion is carried out in the presence of an inert gas, such as nitrogen, carbon dioxide, and/or steam. Alternatively, the biomass thermo-catalytic conversion can be carried out in the presence of a reducing gas, such as hydrogen, carbon monoxide, non-condensable gases recycled from the biomass conversion process, or combinations thereof.

Referring again to FIG. 1, the conversion effluent 20 exiting the biomass conversion reactor 18 generally comprises gas, vapors, and solids. As used herein, the vapors produced during the conversion reaction may interchangeably be referred to as "bio-oil," which is the common name for the vapors when condensed into their liquid state. In the case of biomass thermo-catalytic conversion, the solids in the conversion effluent 20 generally comprise particles of char, ash, unconverted portions of biomass, and/or spent catalyst. Because such solids (particularly the unconverted biomass and spent catalyst) can contribute to the tendency of the bio-oil to form ash, it is particularly desirable to remove the solids so that the bio-oil is essentially solids free, preferably having an ash content (solids content) of less than about 3000 ppmw, 2000 ppmw, or 1000 ppmw.

As depicted in FIG. 1, the conversion effluent 20 from the biomass conversion reactor 18 can be introduced into a solids separator 22. The solids separator 22 can be any conventional device capable of separating solids from gas and vapors such as, for example, a cyclone separator, a gas filter, or combinations thereof. The solids separator 22 removes a substantial portion of the solids (e.g., spent catalysts, char, and/or heat carrier solids) from the conversion effluent 20. The solid particles 24 recovered in the solids separator 22 can be introduced into a regenerator 26 for regeneration, typically by combustion. After regeneration, at least a portion of the hot regenerated solids can be introduced directly into the biomass conversion reactor 18 via line 28. Alternatively or additionally, the hot regenerated solids can be directed via line 30 to the biomass feed system 16 for combination with the biomass feedstock prior to introduction into the biomass conversion reactor 18.

The substantially solids-free stream 32 exiting the solids separator 22 can then be introduced into a condenser 34. Within the condenser 34, the vapors are condensed or partially condensed into a bio-oil stream 36 and separated from the non-condensable gases. In certain embodiments, the condenser 34 can use water recycled from the conversion of biomass as a quench stream. The separated and condensed bio-oil can have an organic oxygen content of at least 5, 10, 15, or 20 weight percent and/or not more than 40, 30, or 25 weight percent. As shown in FIG. 1, the separated non-condensable gases are removed from the condenser 34 as a non-condensable gas stream. The non-condensable gases removed from the condenser 34 may be, optionally, recycled to the biomass conversion reactor 18 for use as a lift gas.

Subsequent to exiting the condenser 34, the bio-oil stream 36 is introduced into a hydrotreater 38. Due to the high quality and the low sulfur content of the bio-oil, the bio-oil stream 36 may not be subjected to fractionation, washing, decanting, centrifugation, desalting, extraction, adsorption, reverse osmosis, and/or deoxygenation prior to introduction into the hydrotreater 38. Alternatively, if necessary, the bio-oil stream 36 can be subjected to fractionation, dehydration, phase separation, and/or deoxygenation prior to introduction into the hydrotreater 38. In one particular embodiment, the bio-oil stream 36 can be subjected to phase separation prior to introduction into the hydrotreater 38. In such an embodiment, the bio-oil stream 36 is separated into an aqueous stream, which can be recycled into the process, and a non-aqueous stream, which is introduced into the hydrotreater 38.

The hydrotreater 38 removes oxygen from at least a portion of the bio-oil stream 36 to thereby produce a hydrotreated bio-oil stream 40. The organic oxygen content of the hydrotreated bio-oil 40 can be no more than about 10, 5, 1, or 0.5 weight percent. Additionally or alternatively, the hydrotreated bio-oil 40 can have a Total Acid Number (TAN) value that is at least 50, 70, or 90 percent less than the TAN value of the bio-oil stream 36. The hydrotreater 38 can be any conventional hydrotreater commonly known and used in the art. In certain embodiments, the hydrotreater 38 predominantly removes oxygen from the bio-oil stream 36 and performs little or no hydrocracking of the bio-oil stream 36. In such an embodiment, the hydrotreater 38 converts no more than about 60, 50, 40, 30, 15, 10, or 5 weight percent of the bio-oil stream into a $C_{4-}$ gas.

The hydrotreated bio-oil stream 40 exiting the hydrotreater 38 can then be introduced into a fractionator 42. In the fractionator 42, at least a portion of the hydrotreated bio-oil stream 40 can be separated into a hydrotreated biomass-derived naphtha fraction 44, a hydrotreated bio-distillate fraction 46, and a hydrotreated bio-gas oil fraction 48. Suitable systems to be used in the fractionator 42 include, for example, vacuum distillation, wiped film evaporation, fractional distillation, heated distillation, extraction, membrane separation, partial condensation, and/or non-heated distillation. In the event that heat distillation is implemented in the fractionator 42, it can be carried out under conditions ranging from a vacuum up to pressures above atmospheric pressure. As shown in FIG. 1, non-condensable gases removed from the fractionator 42 may be, optionally, recycled to the biomass conversion reactor 18 for use as a lift gas.

In certain embodiments, at least 10, 20, or 30 weight percent and/or not more than 70, 60, or 50 weight percent of the hydrotreated bio-oil stream 40 subjected to fractionating is fractionated into the hydrotreated biomass-derived naphtha fraction 44; at least at least 20, 30, or 40 weight percent and/or not more than 80, 70, or 60 weight percent of the hydrotreated bio-oil stream 40 subjected to fractionating is fractionated into the hydrotreated bio-distillate fraction 46; and/or at least 1, 2, or 5 weight percent and/or not more than 30, 20, or 15 weight percent of the hydrotreated bio-oil stream 40 subjected to fractionating is fractionated into the hydrotreated bio-gas oil fraction 48. In certain embodiments, at least 75, 90, or 95 weight percent of the hydrotreated biomass-derived naphtha fraction 44 boils at a temperature above 25° C., 30° C., or 35° C. and/or below 225° C., 200° C., or 175° C.; at least 75, 90, or 95 weight percent of the hydrotreated bio-distillate fraction 46 boils at a temperature of at least 140° C., 160° C., or 180° C. and/or not more than 350° C., 320° C., or 300° C.; and/or at least 75, 90, or 95 weight percent of the hydrotreated bio-gas oil fraction 48 boils at a temperature of at least 280° C., 300° C., 320° C., or 340° C. In certain embodiments, the hydrotreated biomass-derived naphtha fraction 44 has a mid-boiling point of at least 90° C., 100° C., or 110° C. and/or not more than 150° C., 140° C., or 130° C.

Upon exiting the fractionator 42, at least a portion of the hydrotreated biomass-derived naphtha fraction 44 can be introduced into a reformer 12. The reformer 12 reforms at least a portion of the hydrotreated biomass-derived naphtha fraction 44 to thereby produce a reformate 50, hydrogen 52, and light gases. The reforming process can utilize a reforming catalyst comprising at least one noble metal such as, for example, platinum and/or rhenium. The reforming process can be carried out at a temperature of at least 450° C., 475° C., or 495° C. and/or not more than 600° C., 550° C., or 525° C. The reforming process can be carried out at a pressure of at least 2, 4, or 5 atmospheres and/or not more than 75, 55, or 45 atmospheres. In certain embodiments, at least a portion of the heat generated from the hydrotreater 38 can be recovered and used to heat the reformer 12 to reforming temperatures. The reforming process can be carried out in any reformer known in the art such as, for example, a continuous catalytic reformer (CCR) reformer and/or a semi-regenerative reformer. In certain embodiments, olefin-rich streams can be co-fed to the reformer to reduce benzene production and facilitate production of higher molecular weight alkyl aromatics. In one embodiment, the olefin-rich stream includes olefins recovered from the thermo-catalytic conversion process. In certain embodiments, the olefin-rich stream comprises at least 50, 60, or 70 weight percent of C3 and C4 olefins.

As discussed above, the hydrotreated biomass-derived naphtha fraction 44 can serve as an enhanced reformer feedstock due at least in part to its high N+2A value. Furthermore, due to its higher quality, the hydrotreated biomass-derived naphtha fraction 44 does not require additional processing and/or refining in order to be used as a reformer feedstock. For instance, the hydrotreated biomass-derived naphtha fraction 44 can have an olefins content of not more than 10, 5, or 2 percent by volume and/or a sulfur content of less than 50, 20, or 10 parts per million by weight. Since the hydrotreated biomass-derived naphtha fraction 44 can have such a low olefin and/or sulfur content, the hydrotreated biomass-derived naphtha fraction 44 may not be subjected to hydrocracking, additional hydrotreating, sulfur-removal, and/or any other additional refining before being introduced into the reformer 12.

The hydrotreated biomass-derived naphtha fraction 44 can be combined with other naphtha feedstocks prior to being introduced into the reformer 12. For example, at least a portion of the hydrotreated biomass-derived naphtha fraction 44 can be combined with a petroleum-derived naphtha prior to being introduced into the reformer 12, which can result in raising the N+2A value for the blended feed over that of the petroleum-derived naphtha. In one embodiment, at least 25, 50, 75, or 95 percent by volume of the naphtha being introduced in the reformer 12 is a biomass-derived naphtha that originates from a biomass material. In another embodiment, substantially all of the naphtha being introduced into the reformer 12 is a biomass-derived naphtha that originates from biomass. In yet another embodiment, at least 25, 50, 75, or 95 percent by volume of the naphtha being introduced into the reformer 12 is a biomass-derived naphtha that has previously been subjected to hydrotreatment. In still yet another embodiment, substantially all of the naphtha being introduced into the reformer 12 is a biomass-derived naphtha that has previously been subjected to hydrotreatment.

The produced reformate 50 can have a research octane number (RON) that is at least 5, 10, or 20 percent greater than the RON of the hydrotreated biomass-derived naphtha fraction 44. For instance, the reformate 50 can have a research octane number (RON) of at least 95, 97, or 99. In one embodiment, at least a portion of the reformate is introduced into a petrochemical plant 54. The petrochemical plant 54 can convert at least a portion of the reformate 50 into at least one mono-aromatic enriched stream 56 comprising predominately benzene, toluene, ethyl benzene, cumene, or xylenes.

The reforming process can produce at least 600, 700, 800, or 850 standard cubic feet of hydrogen per barrel of hydrotreated biomass-derived naphtha fraction 44 subjected to reforming. In one embodiment, at least a portion of the hydrogen 52 produced from the reforming process can be recycled and used in the hydrotreater 38. In another embodiment, the hydrogen 52 generated from the reforming process can be the sole source of hydrogen for the hydrotreater 38.

EXAMPLES

Examples 1-5

A naphtha fraction of a hydrotreated bio-mass feedstream was made as illustrated in FIG. 1 by introducing a lignocellulosic material into a biomass conversion reactor and thermo-catalytically converting the biomass to bio-oil. Solids were removed from the bio-oil and a substantially solids-free bio-oil stream was then introduced to a hydrotreating reactor and subjected to hydrotreatment. The hydrotreated bio-oil stream was subjected to fractionation and the $C_{5+}$ naphtha fraction having a boiling point less than 420° F. was isolated. The composition of the fraction was measured and compared to that of four $C_{5+}$ naphtha fractions typical of those isolated from a variety of conventional crude oils. Reformer performance or reformability was defined by the $C_{5+}$ reformate yield versus feed volume percent naphthenes (aka cyclo-paraffins) and aromatics (N+2A) using a reforming yield model similar to that disclosed in *Conversion Unit Yield Analysis*, 2008 *Fuels Refinery Performance Analysis*, HSB Solomon Associates LLC, 2010. The model was run at a reformer pressure of 200 psig and a Research Octane Number (RON) of 96. The data is set forth in Table I which illustrates the correlation between reformate yield and naphtha composition as measured by N+2A. Similar trends are observed when the reforming yield model is run at other target Research Octane Numbers.

TABLE I

| | Comp. Ex. 1 | Comp. Ex. 2 | Comp. Ex. 3 | Comp. Ex. 4 | Ex. 5 |
|---|---|---|---|---|---|
| Feed N + 2A (vol. %) | 50 | 60 | 70 | 80 | 113.6 |
| Reformate Yield, Vol. % (per 100 gal feed) | 78.3 | 81.9 | 85.0 | 87.3 | 91.0 |

The inventor hereby states his intent to rely on the Doctrine of Equivalents to determine and assess the reasonably fair scope of the present invention as it pertains to any apparatus not materially departing from but outside the literal scope of the invention as set forth in the following claims.

What is claimed is:

1. A process for producing a fuel, said process comprising: reforming a naphtha in the presence of a reforming catalyst to thereby produce hydrogen and a reformate, wherein said naphtha has an N+2A value of at least 90 percent by volume and a paraffins content of not more than 10 percent by volume and further wherein at least 50 percent by volume of said naphtha originates from fibrous cellulosic biomass material which is treated in a biomass conversion reactor to produce bio-oil.

2. The process of claim 1 wherein at least 75 percent by volume of said naphtha is a biomass-derived naphtha that originates from a biomass material.

3. The process of claim 2 wherein said biomass-derived naphtha is produced by thermo-catalytic conversion of said biomass material.

4. The process of claim 1 wherein at least a portion of said naphtha is a hydrotreated bio-oil that has been previously been subjected to hydrotreatment, further comprising introducing at least a portion of said produced hydrogen into a hydrotreater used for said hydrotreatment.

5. The process of claim 1 wherein said reformate has a research octane number (RON) that is at least 5 percent greater than the RON of said naphtha.

6. The process of claim 1 further comprising introducing at least a portion of said reformate into a petrochemical plant, wherein said petrochemical plant produces at least one mono-aromatic enriched stream comprising predominately benzene, toluene, xylenes, ethyl benzene, or cumene.

7. A process for producing a renewable fuel, said process comprising:
(a) thermo-catalytically converting a cellulosic biomass material to thereby produce a bio-oil;
(b) hydrotreating at least a portion of said bio-oil to thereby produce a hydrotreated bio-oil;
(c) fractionating at least a portion of said hydrotreated bio-oil to thereby produce at least a hydrotreated biomass-derived naphtha fraction and a hydrotreated bio-distillate fraction, wherein said hydrotreated biomass-derived naphtha fraction has an N+2A value of at least 90 percent by volume and a paraffins content of less than 10 percent by volume; and
(d) reforming at least a portion of said hydrotreated biomass-derived naphtha fraction to thereby produce hydrogen and a reformate.

8. The process of claim 7 wherein said bio-oil is not subjected to fractionation prior to said hydrotreating of step (b).

9. The process of claim 7 further comprising recovering heat from said hydrotreating of step (b) and using at least a portion of the recovered heat in said reforming of step (d).

10. The process of claim 7 wherein said hydrotreated biomass-derived naphtha fraction is not subjected to hydrocracking after said fractionating of step (c) and before said reforming of step (d).

11. The process of claim 7 wherein said fractionating of step (c) is carried out by heated distillation.

12. The process of claim 7 wherein said reforming of step (d) produces at least 600 standard cubic feet of said hydrogen per barrel of said hydrotreated biomass-derived naphtha fraction subjected to said reforming of step (d).

13. The process of claim 7 wherein at least a portion of said hydrogen is used in said hydrotreating of step (b).

14. A process for producing a renewable fuel, said process comprising:
(a) thermo-catalytically converting a lignocellulosic biomass material to produce a bio-oil;
(b) introducing at least a portion of the bio-oil into a hydrotreater and removing oxygen from the bio-oil, wherein the oxygen content of the hydrotreated bio-oil is no more than 10 weight percent;
(c) introducing at least a portion of the hydrotreated bio-oil into a fractionator and fractionating the hydrotreated bio-oil to produce a hydrotreated biomass-derived naphtha and a hydrotreated bio-distillate, wherein said hydrotreated biomass-derived naphtha has an N+2A value of at least 90 percent by volume and a paraffins content of less than 10 percent by volume; and
(d) introducing at least a portion of the hydrotreated biomass-derived naphtha into a reformer and reforming the hydrotreated biomass-derived naphtha to produce a reformate and hydrogen wherein the research octane number (RON) of the reformate is at least 5 percent greater than the RON of the hydrotreated biomass-derived naphtha.

15. The process of claim 14 wherein the process comprises combining at least a portion of the hydrotreated bio-oil derived naphtha with a petroleum-derived naphtha and then reforming the combination of hydrotreated bio-oil derived naphtha and petroleum-derived naphtha in the reformer in the presence of a reforming catalyst wherein at least 50 percent by volume of the naphtha in the combination is the hydrotreated biomass-derived naphtha.

16. The process of claim 14 wherein at least 75 weight percent of said hydrotreated biomass-derived naphtha boils at a temperature above 25° C. and below 225° C., wherein said hydrotreated biomass-derived naphtha has a mid-boiling point of at least 90° C. and not more than 150° C.

17. The process of claim 16 wherein said hydrotreated biomass-derived naphtha has an N+2A value of at least 95 percent by volume.

18. The process of claim 17 wherein said hydrotreated biomass-derived naphtha has a paraffins content of not more than 6 percent by volume, a naphthenes content of at least 20 percent by volume, an aromatics content of at least 20 percent by volume, and an olefins content of not more than 10 percent by volume.

19. The process of claim 14 wherein said reforming is carried out at a temperature of at least 450° C. and not more than 600° C., wherein said reforming is carried out at a pressure of at least 2 atmospheres and not more than 75 atmospheres, wherein said reforming catalyst comprises at least one noble metal.

20. The process of claim 14 wherein at least 90 weight percent of said hydrotreated biomass-derived naphtha boils at a temperature above 30° C. and below 200° C., wherein said hydrotreated biomass-derived naphtha has a mid-boiling point of at least 100° C. and not more than 140° C.

21. The process of claim 20 wherein said hydrotreated biomass-derived naphtha has an N+2A value of at least 100 and not more than 150 percent by volume, a paraffins content of not more than 4 percent by volume, a naphthenes content of at least 30 and not more than 70 percent by volume, an aromatics content of at least 25 and not more than 60 percent by volume, an olefins content of not more than 5 percent by volume, and a sulfur content of less than 20 parts per million by weight.

* * * * *